United States Patent [19]

Quinn

[11] 4,085,316

[45] Apr. 18, 1978

[54] PHOTOGRAPHIC FLASH DEVICE

[75] Inventor: Peter T. Quinn, Littleton, Colo.

[73] Assignee: Rollei of America, Inc., Littleton, Colo.

[21] Appl. No.: 641,478

[22] Filed: Dec. 17, 1975

[51] Int. Cl.² ............................................. G03B 15/02
[52] U.S. Cl. ...................................................... 362/16
[58] Field of Search .................. 240/93, 2 C, 20, 1 R, 240/41.4 D, 46.59, 1.3, 41; 355/67

[56] References Cited

U.S. PATENT DOCUMENTS

| 2,089,699 | 8/1937 | Keller | 240/93 |
| 3,111,274 | 11/1963 | Turano | 240/1.3 |
| 3,215,883 | 11/1965 | McClees | 240/1.3 X |
| 3,351,409 | 11/1967 | McGuire | 240/46.59 X |
| 3,386,360 | 6/1968 | Nerwin | 240/46.59 X |
| 3,878,385 | 4/1975 | Kingston | 240/1.3 |

FOREIGN PATENT DOCUMENTS 742,679  12/1955  United Kingdom .................. 240/1.3

Primary Examiner—Donald Griffin
Attorney, Agent, or Firm—Allegretti, Newitt, Witcoff & McAndrews

[57] ABSTRACT

An attachment for photographic flash equipment comprises a dome shaped member which is primarily constructed of light diffusing material but having a portion thereof which is considerably less light diffusing and which operates to direct some of the light emitted by the flash equipment away from a subject to be photographed so that it may be reflected from a nearby surface and thus indirectly illuminate the subject.

9 Claims, 2 Drawing Figures

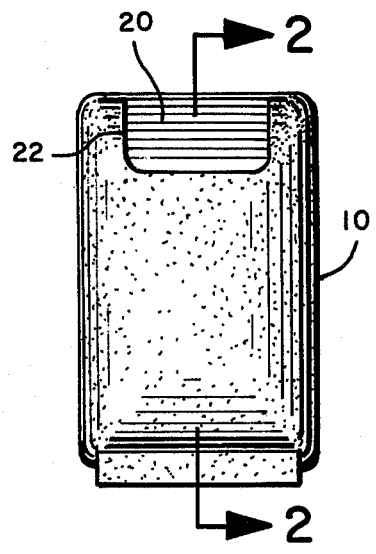
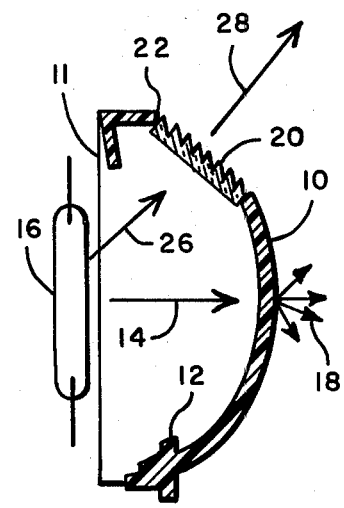
FIG. 1
FIG. 2

PHOTOGRAPHIC FLASH DEVICE

BACKGROUND OF THE INVENTION

The present invention relates to photographic flash equipment and, more particularly, to an attachment for a photographic flash device which will allow the flash device to be used in a "bounce flash" mode.

As is well known in the art of photography, there are occasions when it is desirable to illuminate a subject to be photographed with light that is reflected from a nearby surface. Most often, the nearby surface is a ceiling above the subject to be photographed so that in the photograph, the subject will appear to be illuminated primarily from above in a way characteristic of the natural lighting of the sun. It is also usually desirable to illuminate the subject directly from the flash equipment at the same time so as to eliminate or modify shadows which might develop from the downwardly directed illumination. The direct illumination of the subject is usually required to be soft or diffused light so that the "bounce flash" light from above is not washed and to give more natural appearance to the subject.

Photographers having flash equipment which is carried separately from the camera may accomplish the above "bounce flash" operation by pointing the flash equipment towards the ceiling above the subject. However, a large number of cameras are sold today in which the flash equipment is mounted directly on the camera, and the photographer cannot aim the flash equipment in a different direction than he aims the camera. This is true of the usual flash bulb or flash cube type of flash equipment as well as the "shoe mounted" electronic flash equipment. With this type of equipment, "bounce flash" photography has not been possible.

One attempt to provide "bounce flash" capability in such equipment was proposed by the assignee of the present invention in the form of a dome shaped member constructed of light diffusing material and adapted to be mounted over the usual flash apparatus. The dome shaped member had a hole in the upper portion and a mirror mounted in the lower portion and was to be operable to direct some of the light from the flash apparatus to the mirror where it was to be reflected out of the hole towards the ceiling. Light passing through the dome shaped member was to provide direct illumination while light passing through the hole was to provide a bounce flash off of the ceiling.

This prior art attempt proved to be impractical because the mirror mounted in the lower part of the dome shaped member blocked some of the light which was desired to pass directly through the dome and some of the light from the flash apparatus passed directly through the hole and produced irregular spotted or streaked illumination of the scene to be photographed.

SUMMARY OF THE INVENTION

The present invention overcomes the difficulties of the prior art by providing a dome shaped member for attachment to the flash equipment. The dome is diffused and allows direct illumination of the subject but no mirror is employed thus eliminating the undesirable light blocking effects of the prior art.

By use of a relatively clear lens, some of the light from the flash equipment is directed at an angle away from the scene to be photographed so that it does not irregularly illuminate the scene but nevertheless allows a bounce flash effect.

BRIEF DESCRIPTION OF THE DRAWINGS

FIG. 1 is a front view of the apparatus of the present invention; and

FIG. 2 is a cross-sectional view of the apparatus of the present invention taken along lines 2 — 2 of FIG. 1.

DETAILED DESCRIPTION OF THE PREFERRED EMBODIMENT

FIG. 1 and FIG. 2 show a dome shaped member 10 having mounting flanges 11 and 12 for attachment to photographic flash equipment not shown. The dome shaped member 10 may be constructed of molded plastic or glass which is translucent but which has some opacity or preferably a neutral density such that light shown in FIG. 2 by an arrow 14, emanating from a flash bulb or flash cube 16 becomes diffuse as shown by arrows 18 as it passes through the dome 10. The purpose of causing the light to be diffuse is to illuminate the subject in a direct fashion but with soft light primarily to eliminate shadows. Of course, the density may be chosen throughout a fairly wide range from nearly transparent to nearly opaque depending upon the desires of the photographer.

A Fresnel lens 20 is shown in the FIGURES mounted in an aperture 22. Aperture 22 is located upwardly on the dome shaped member 10 so that some of the light, such as shown by arrow 26, emanating from the flash bulb or flash cube 16 upwardly is passed through the lens 20 in a relatively nondiffused manner and at a substantial angle from the horizontal as is shown by arrow 28.

It is usually desirable to use a transparent material, such as a glass or clear plastic, for constructing Fresnel lens 20 and to choose the focal length to be such as to allow as much light as possible for the "bounce flash" operation. Care must be exercised, however, to avoid having the light passing through the lens enter the field of view of the camera, at least within that distance from the camera where the non-diffused light could be directly reflected onto the film and thus produce a light streak or spot in the photograph. Therefore, the position of aperture 22 and the focal length of the Fresnel lens 20 should be chosen with the field of view of the particular camera with which the apparatus is intended to be used in mind. In the embodiment shown, the aperture is at about 60° from the horizontal and the focal length of the lens 20 is about twice the distance from the lens to the center of the light source 16 for use on popular cameras which have a field of view of about forty or fifty degrees. While in the preferred embodiment a Fresnel lens 20 has been chosen to direct relatively nondiffused light upwards towards the ceiling when the equipment is being used to illuminate a subject to be photographed, other type lenses or light transmissive members may be employed so long as sufficient light is transmitted to achieve the desired "bounce flash" effect.

In the preferred embodiment, the "bounce flash" light is relatively nondiffused so that upon reflection from a nearby surface, it will illuminate the subject as the primary light source and the subject will then appear to have natural illumination from a direction other than that where the camera is located. The amount of diffusion produced by the dome shaped member 10 may be chosen to satisfy varying circumstances and photographer requirements.

It is thus seen that I have provided apparatus for use with photographic flash equipment which can accomplish a "bounce flash" effect without the necessity of directing the flash equipment at an angle to the subject being photographed. Many modifications and alterations will be apparent to those skilled in the art. For example, the shape of the attachment may be made to conform to mounting on a large variety of flash bulb, flash cube or electronic flash equipment and the base need not be the generally rectangular shape shown in the preferred embodiment. Likewise, while the dome shaped member is shown having a smoothly curved light transmitting portion, boxlike, flat and other dome shapes may be employed. It is also apparent that the neutral density of the dome 10 and of the lens 20 may be chosen in various ratios to achieve interesting primary and secondary contributions to the lighted subject during photographic events. I therefore do not wish to be limited by the specific structure used in the description of the preferred embodiment but rather intend only to be limited by the appended claims.

I claim:

1. Apparatus for use with photographic flash equipment including a source of light associated with a camera, for providing a bounce flash from a nearby surface to photograph a subject comprising:

a light diffusing dome shaped member including means for removably attaching the member to the photographic flash equipment between the source of light and a subject to be photographed for providing a first part of the light emitted from the source of light to pass through said member in a first general direction to directly illuminate the subject to be photographed, said member having a sole portion which is substantially less light diffusing for directing a second part of the light emitted from the source of light directly through said member in a single second general direction away from the subject to be photographed for reflecting said second part of light from a nearby surface to indirectly illuminate the subject to be photographed, said portion located for a positioning of the camera for causing said second part of the light to bounce solely from a surface above the subject during photographing whereby the subject appears to be illuminated from above and shadows are formed to give a more natural appearance of the subject.

2. Apparatus according to claim 1 wherein the portion comprises an aperture in the member with a light transmissive insert in the aperture.

3. Apparatus according to claim 2 wherein the insert comprises a lens.

4. Apparatus according to claim 3 wherein the lens comprises a Fresnel lens.

5. Apparatus according to claim 1 wherein the member is comprised of plastic having a first neutral density and the portion being substantially clear.

6. Apparatus according to claim 1 wherein the portion is positioned so that the second part of the light does not directly enter the field of view of the camera.

7. Apparatus for use with photographic flash equipment including a source of light associated with a camera for providing a bounce flash from a nearby surface to photograph a subject, comprising: a light diffusing dome shaped member including means for removably attaching the member to the photographic flash equipment between the source of light and a subject to be photographed for providing a first part of the light emitted from the source of light to pass through said member in a first general direction to directly illuminate the subject, said member having a portion which is substantially less light diffusing for directing a second part of the light emitted from the source of light directly through said member in a single second general direction at an angle less than 90° from the first direction for reflecting said second part of light from a nearby surface to indirectly illuminate the subject to be photographed, said portion comprising: an aperture in said member; and a light transmissive insert in said aperture, said insert comprising a lens; and said portion positioned and the focal length of said lens chosen so that said second part of the light does not directly enter the field of view of the camera.

8. Apparatus according to claim 7, wherein said lens comprises a fresnel lens.

9. Apparatus according to claim 8 wherein said lens is plastic.

* * * * *